Figures 1, 2:
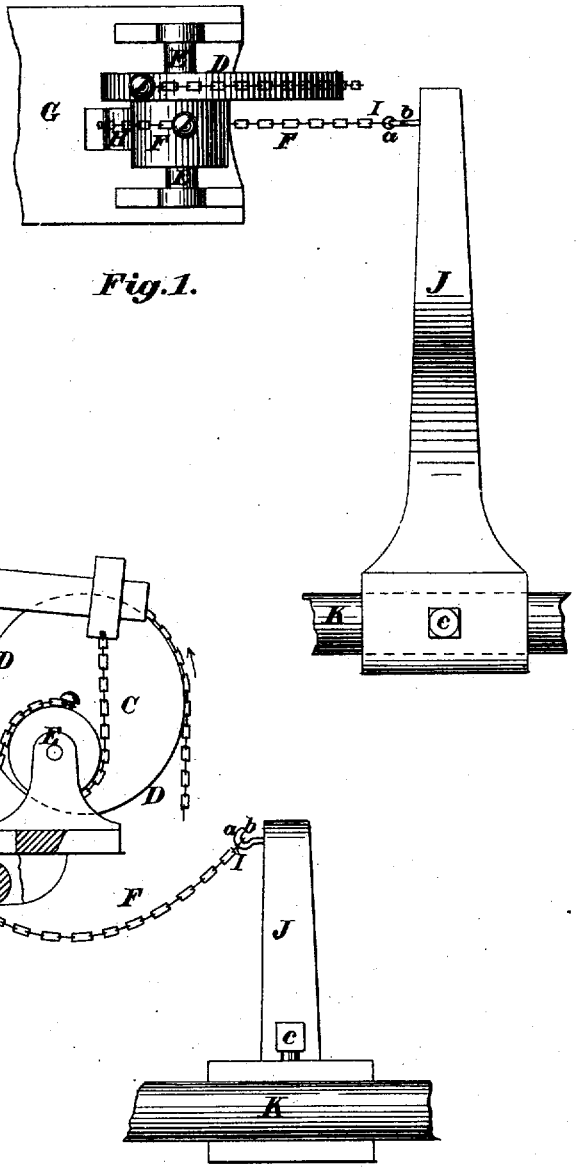

N. C. LOCKE,

Assignor of one-half interest to A. C. LOCKE.

Fluid Pressure Regulator

No. 9,466. Reissued Nov. 16, 1880.

Witnesses:

Geo. S. Searle

John H. Russell.

Inventor:

Nathaniel C. Locke

N. PETERS, PHOTO-LITHOGRAPHER, WASHINGTON, D. C.

UNITED STATES PATENT OFFICE.

NATHANIEL C. LOCKE, OF SALEM, MASSACHUSETTS, ASSIGNOR OF ONE-HALF INTEREST TO ALPHEUS C. LOCKE.

FLUID-PRESSURE REGULATOR.

SPECIFICATION forming part of Reissued Letters Patent No. 9,466, dated November 16, 1880.

Original No. 133,459, dated November 26, 1872. Application for reissue filed August 23, 1880.

*To all whom it may concern:*

Be it known that I, NATHANIEL C. LOCKE, of Salem, in the county of Essex and State of Massachusetts, have invented a new and useful Improvement in Cut-Off Attachments for Steam-Pressure Regulators, of which the following is a specification.

The invention consists in a novel combination and arrangement of mechanical devices for connecting a steam-pressure regulator with the shipper-rod of the machine to which steam is being supplied by said regulator—as, for instance, a slasher for dressing cotton-warps.

In the accompanying drawings the present invention is illustrated, Figure 1 being a plan view, and Fig 2 a side elevation.

A is a portion of a steam-pressure regulator having my improvement applied, B being the lever arranged to press on the diaphragm of the regulator, which lever, through a flexible band, C, is connected to a pulley on the same shaft with eccentric D that carries the weight. E is the axis of the eccentric D. To this axis E is attached one end of a chain, F. This chain F passes through the bed-plate G of the regulator, running against a friction-roller, H, and at its end I by an eye, *a*, is connected to the hook end *b* of the arm J. This arm J is secured and made adjustable, by set-screw *c*, to the shipper-rod K of the slasher, and extends outward beyond the frame of the slasher as far as the center of the regulator, so that when moved in the act of shipping to stop the slasher, and when near the end of the stroke, the slack-chain is taken up, thereby operating to raise the weights partially or wholly, as desired, to diminish or entirely remove the load from the diaphragm of the regulator, and thereby allowing the valve of said regulator to partially or wholly cut off the supply of steam to the cylinders of the slasher.

What I claim as my invention, and desire to secure by Letters Patent, is—

1. The combination and arrangement of the flexible band or chain F, arm J, and shipper-rod K, with the axis E of eccentric D and a steam-pressure regulator, all constructed to operate substantially as and for the purpose described.

2. The combination, with a steam-pressure regulator and a slasher, of a shipper-rod so arranged and connected that in stopping the slasher the rod will also engage with the regulator, thereby cutting off the steam from the slasher, substantially as shown and described.

3. Arm J, connected to and carried by shipper-rod K, extending outward to or beyond lever B, and so connected that in stopping the slasher it shall engage with the regulator to cut off the steam.

NATHANIEL C. LOCKE.

Witnesses:
JAS. M. CALLER,
CHAS. A. ESTES.